(12) United States Patent
Tsukamoto

(10) Patent No.: US 6,956,804 B2
(45) Date of Patent: Oct. 18, 2005

(54) OPTICAL RECORDING MEDIUM WITH RECORDING MARKS HAVING DIFFERENT STATES, AND METHOD OF RECORDING USING THE OPTICAL RECORDING MEDIUM

(75) Inventor: Syuji Tsukamoto, Tokyo (JP)

(73) Assignee: TDK Corporation, Tokyo (JP)

( * ) Notice: Subject to any disclaimer, the term of this patent is extended or adjusted under 35 U.S.C. 154(b) by 465 days.

(21) Appl. No.: 09/972,873

(22) Filed: Oct. 10, 2001

(65) Prior Publication Data
US 2002/0044512 A1 Apr. 18, 2002

(30) Foreign Application Priority Data
Oct. 10, 2000 (JP) ........................................ 2000-309333

(51) Int. Cl.[7] .............................................. G11B 7/125
(52) U.S. Cl. ................................ 369/59.11; 369/275.2; 369/116
(58) Field of Search ............................. 369/59.11, 116, 369/275.2

(56) References Cited

U.S. PATENT DOCUMENTS

| | | | |
|---|---|---|---|
| 5,134,606 A | * | 7/1992 | Sekiguchi et al. .......... 369/116 |
| 5,136,573 A | | 8/1992 | Kobayashi |
| 5,396,480 A | * | 3/1995 | Morishita et al. ........... 369/116 |
| 6,567,367 B2 | * | 5/2003 | Ohno et al. ................. 369/116 |
| 6,611,484 B2 | * | 8/2003 | Tsukamoto ............... 369/59.11 |
| 6,699,557 B2 | * | 3/2004 | Arioka et al. ............... 428/64.4 |

FOREIGN PATENT DOCUMENTS

| | | | | |
|---|---|---|---|---|
| EP | 1128365 | | 8/1901 | |
| EP | 1 235 210 A1 | * | 8/2002 | ......... G11B/7/0045 |
| JP | 02278535 | | 11/1990 | |
| JP | 04012885 | | 1/1992 | |
| JP | 04219626 | | 8/1992 | |
| WO | 00/25308 | | 10/1999 | |
| WO | WO 01/27917 A1 | * | 4/2001 | ......... G11B/7/0045 |

* cited by examiner

*Primary Examiner*—A M Psitos
(74) *Attorney, Agent, or Firm*—Oliff & Berridge, PLC

(57) ABSTRACT

An optical recording medium having a higher improved read accuracy is disclosed. In the case of irradiating a laser beam to an optical recording medium including an optical reflective layer and a recording layer so as to record information therein, in the recording layer, a virtual recording cell having an arbitrary unit length and a unit width perpendicular to the unit length is continuously defined. In the case where the laser beam is irradiated to the virtual recording cell over the entire allowable irradiation time T securable to one virtual recording cell, a reference power of the laser beam is preset so that an optical reflectance of the virtual recording cell can be reduced more than 50% with respect to the initial reflectance. Further, the laser beam having the preset reference power is irradiated to the virtual recording cell in a state that an irradiation time is modulated into five stages or more, and thereby, a recording mark giving five stages or more different optical reflectance to the virtual recording cell can be formed.

12 Claims, 6 Drawing Sheets

OPTICAL RECORDING MEDIUM WITH RECORDING MARKS HAVING DIFFERENT STATES, AND METHOD OF RECORDING USING THE OPTICAL RECORDING MEDIUM

BACKGROUND OF THE INVENTION

1. Field of the Invention

The present invention relates to an optical recording medium and method, which record information by irradiating a laser beam to a recording layer so as to form a recording mark, and in particular, to a technology of forming a plurality of recording marks having different state so as to record a data at a multi-level.

2. Description of the Related Art

In a conventional optical recording medium, a method has been employed such that a data is recorded by changing a length of read signal (i.e., a length of reflection signal modulation section). On the contrary, the following method has been frequently studied, more specifically, a plurality of data is recorded to each signal having the same length by changing a depth of the read signal (i.e., a modulation degree of reflection signal) at multiple stages.

According to the above optical recording method, as compared with the case where a binary data is merely recorded by the presence of pit, a plurality of data is recorded in a depth direction, so that a signal quantity allocated to a constant length can be increased; therefore, it is possible to improve a track recording density. In general, it is well known to change a power of laser beam at multiple stages, as the method of a depth of read signal at multiple stages. Recently, holograph has been used as the recording medium, and a recording medium having a multiple recording layer has been proposed.

In this case, it is called as multi-level recording to record each data so that a modulation degree of reflection signal is variable at multiple stages.

In the above multi-level recording, a laser beam is irradiated at multiple-stage power in recording; for this reason, in particular, when the power of laser beam gradually becomes large, a problem has arisen such that a signal quality is worsened in reading. Although the above cause has not been proved, the present inventors presume the cause as follows; more specifically, the laser power increases, and thereby, a recording mark area increases.

For example, in order to achieve a high density of the recording information of recording medium, in the case where multi-level recording is carried out in a manner of making small a recording mark, and changing a laser power at multiple stages, a signal quality has remarkably worsened in the recording mark recorded by large laser power.

Namely, if the multi-level recording method is employed using power change, a distance (interval) between the recording marks is made wide, and data detection must be securely made to some degree even if the signal quality has worsened.

Moreover, the conventional concept of achieving the multi-level recording by changing the laser power stepwise is based on the following premise that the recording mark length is at least larger than a radius of focused beam (beam waist) in recording. In general, a diameter of the focused beam is expressed as $K\lambda/NA$ (K: constant, $\lambda$: laser wavelength, NA: numerical aperture of lens. For example, in a pickup used for a CD, the laser wavelength $\lambda$ is 780 nm, the numerical aperture NA is 0.50, and the diameter of focused beam is about 0.8 $\mu$m. Thus, when the recording mark length is made small up to the vicinity of about 0.8 $\mu$m, the above problem of signal deterioration has remarkably arisen. In fact, it is very difficult to achieve five stages or more multi-level recording by the method of changing a laser power.

On the contrary, although is unknown when this application has been filed, an optical recording method has been disclosed in Japanese Patent application No. 2000-187568 filed by the same applicant as this application. More specifically, according to the above optical recording method, in place of the power of laser beam, an irradiation time to a predetermined virtual recording cell area is changed at multiple stages. By doing so, a recording mark (low optical reflectance area) having different size is formed and brings different optical reflectance to the entire virtual recording cell; therefore, at least five stages multi-level recording is possible.

The above optical recording method is a concept quite different from the conventional laser beam irradiation, and probably includes an extremely short irradiation time. Therefore, the case is sufficiently considered such that a recording mark smaller than a beam spot diameter is formed. In other words, multi-stage (five stages or more) and high density multi-level recording can be realized by effectively using an area in which the recording mark has been conventionally considered as being incomplete.

SUMMARY OF THE INVENTION

The present invention has been made in order to further study the above technology. Accordingly, an object of the present invention is to provide an optical recording medium, which can achieve multi-stage (multi-level) and high read-accuracy multi-level recording by setting a power of laser beam to a predetermined range.

The present inventors have earnestly studied optical recording medium and method; as a result, they have confirmed that it is possible to carry out multi-stage and stable high density multi-level recording.

(1) In order to achieve the above object, according to one aspect, the present invention provides an optical recording medium, including a reflective layer and a recording layer, and constructed in a manner that a recording mark is formed on the recording layer by irradiating a laser beam so as to record information, the recording layer being continuously formed in a relative moving direction to the laser beam with plural virtual recording cells, each of which has an arbitrary unit length and a unit width perpendicular to the unit length in the relative moving direction, in the case where the laser beam is irradiated to the virtual recording cell over the entire allowable irradiation time T securable to one virtual recording cell, when the laser beam having a reference power, which is preset so that an optical reflectance of the virtual recording cell is reduced more than 50% with respect to the initial reflectance, being irradiated to the virtual recording cell so that an irradiation time is modulated into five stages or more within the allowable irradiation time T, the virtual recording cell being formed with a recording mark which gives five stages or more different optical reflectance to the virtual recording cell.

(2) Further, the present invention provides the optical recording medium, wherein in the case where the laser beam is irradiated to the virtual recording cell over the entire allowable irradiation time T, the reference power is preset so that a change of the optical reflectance until 4/4T comes after 3/4T of the allowable irradiation time T elapsed is less than 20% of the initial reflectance.

(3) Further, the present invention provides the optical recording medium, wherein the reference power is preset so that a change of the optical reflectance until 4/4T comes after 3/4T of the allowable irradiation time T elapsed is more than 5% of the initial reflectance.

(4) Further, the present invention provides the optical recording medium, wherein the recording layer contains an organic dye.

(5) Moreover, in order to achieve the above object, according to another aspect, the present invention provides an optical recording method, which irradiates an laser beam to an optical recording medium including a reflective layer and a recording layer, and forms a recording mark is formed on the recording layer so as to record information, comprising the following stages of:

continuously forming a virtual recording cell, which has an arbitrary unit length and a unit width perpendicular to the unit length, on the recording layer in a relative moving direction to the laser beam;

presetting a reference power of the laser beam so that an optical reflectance of the virtual recording cell is reduced more than 50% with respect to the initial reflectance in the case where the laser beam is irradiated to the virtual recording cell to the virtual recording cell over the entire allowable irradiation time T securable to one virtual recording cell;

irradiating the laser beam having the preset reference power to the virtual recording cell so that the irradiation time is modulated into five stages or more; and forming a recording mark which gives five stages or more different optical reflectance to the virtual recording cell.

(6) Further, the present invention provides the optical recording method, wherein in the case where the laser beam is irradiated to the virtual recording cell over the entire allowable irradiation time T, the reference power is preset so that a change of the optical reflectance until 4/4T comes after 3/4T of the allowable irradiation time T elapsed is less than 20% of the initial reflectance.

(7) Further, the present invention provides the optical recording method, wherein the reference power is preset so that a change of the optical reflectance until 4/4T comes after 3/4T of the allowable irradiation time T elapsed is more than 5% of the initial reflectance.

(8) Further, the present invention provides the optical recording method, wherein the recording layer contains an organic dye, and is applied in the case of recording information in the recording layer.

DETAILED DESCRIPTION OF THE PREFERRED EMBODIMENTS

First, a description on the principle of the present invention is followed.

In order to set a laser beam power, the present inventors have detailedly studied an allowable irradiation time to each virtual recording cell continuously formed and a change of optical reflectance of the virtual recording cell in the case where the laser beam is irradiated over the entire allowable irradiation time. In this case, the allowable irradiation time is the maximum time consumable for one virtual recording cell in the case of actually writing a recording mark. For example, in the case where the laser beam and the virtual recording cell relatively move at a constant speed, the maximum allowable irradiation time is a time necessary for the laser beam passing through the virtual recording cell. In the case of actually forming a recording mark, multi-stage irradiation times are set within the allowable irradiation time.

Figure 1:
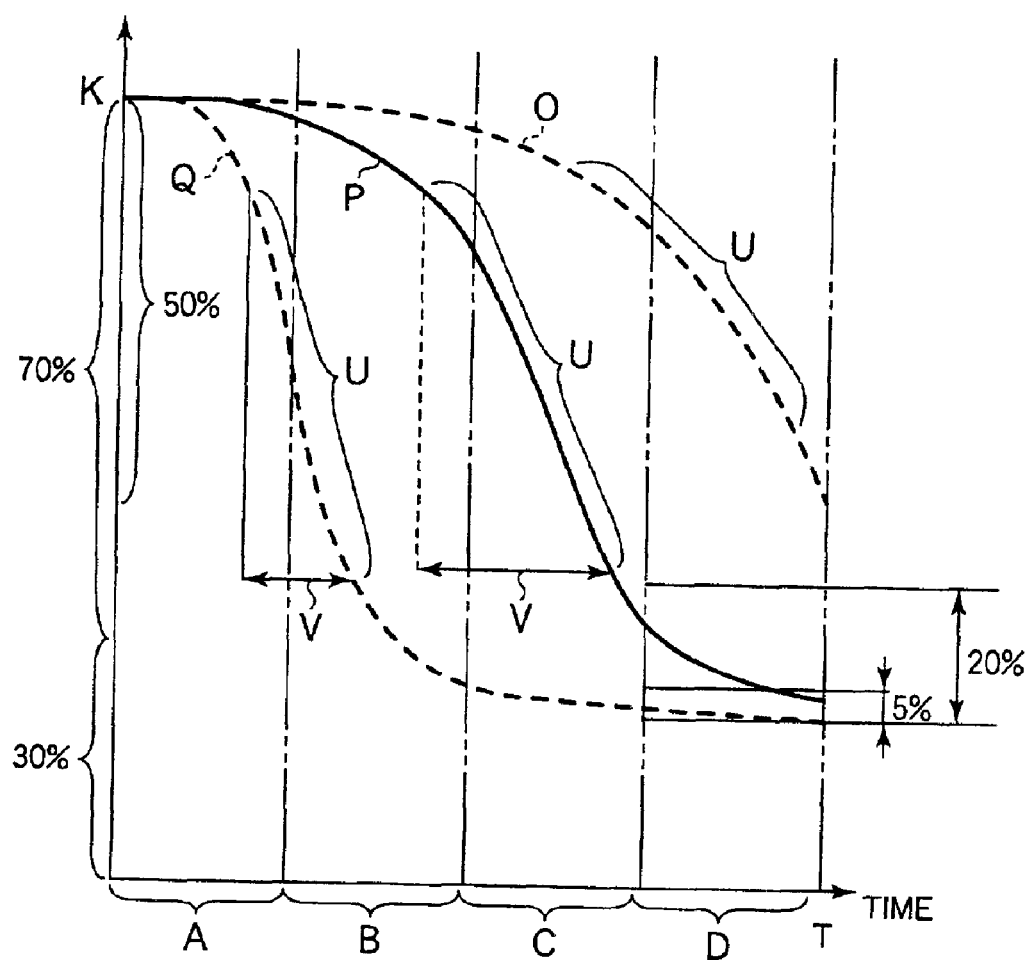
FIG. 1 is a schematic view to explain a procedure for setting a reference power of laser beam in the present invention.

In FIG. 1, the studied result is schematically shown. From the studied result, it can be seen that the following problem arises. More specifically, the allowable irradiation time is divided into four time areas, and then, the initial time area A, the first intermediate time area B, the second intermediate time area C and the termination time area D are set. In this case, when writing information in part of a multi-stage recording mark by laser irradiation until the termination time area D, that is, when largely writing information therein, the recording mark has come near a laser beam irradiation area of the recording mark write start time (i.e., the next initial time area A) in the "next" virtual recording cell. As a result, an unexpected write has been made in an area adjacent to the next recording mark, and it has been found that there is a possibility such that a signal quality is worsened due to read interference with the adjacent virtual recording cell. Namely, when the above preset irradiation time comes too near the allowable irradiation time, the adjacent recording mark or its write laser beam is mutually affected; as a result, a signal quality is worsened in both the former and the latter.

The above problem will be detailedly described below. In FIG. 1, as shown by the dotted line O, in the case where a laser beam is irradiated over the entire allowable irradiation time T, if the laser beam has a (weak) reference power such that the reduction of optical reflectance of virtual recording cell is less than 50% of the initial optical reflectance K, the optical reflectance properly changes. Then, an area U of the dotted line O suitable for multi-stage recording concentrates on the termination time area D. As a result, even if a recording mark is accurately recorded at multiple stages in the termination time area D, the recording mark is deeply recorded by a laser beam for the next recording mark more than an expected largeness, and further, it is difficult to read the virtual recording cell by interference with the virtual recording cell.

In order to solve the above problem, in the present invention, the laser beam is set to a reference power such that the reduction of optical reflectance of the virtual recording cell is 50% or more (preferably, 70% or more).

Therefore, as shown by the solid line P of FIG. 1, an area U of the solid line P suitable for multi-stage recording shifts to the second intermediate time area C, and further, a settable time range V corresponding to the area U is secured relatively long.

As a result, it is possible to record the recording mark at multiple stages in a state of avoiding the interference with the next recording mark, and to slowly set a multi-stage irradiation time in the settable time range V; therefore, five stages or more multi-level recording can be achieved with a high probability.

Namely, in the present invention, the reason why the laser power is set in order not to secure a change of optical reflectance of the virtual recording cell, but to shift the area U suitable for multi-stage recording to the forward side (i.e., first and second intermediate time areas B and C side) from the termination time area D.

In this case, the concept of achieving the multi-level recording by the reference power includes the cases of recording the recording mark with some modifications. More specifically, there are the case where the laser power in recording start is set slightly stronger than the reference power, and the case where the laser beam is irradiated like a pulse in the vicinity of recording completion time, etc.

As already described, it has found that the termination time area D, in particular, its end side is a portion (time), which is hard to be included as irradiation time. Thus, the present inventors have the following idea; more specifically, the optical reflectance properly changes in the vicinity of the end side, and this is useless in a sense (because the end side is a portion, which is not actually used). The useless is a factor of reducing the settable time range V.

According to the present invention, multi-level recording is achieved by a reference power of about 20% of the initial optical reflectance K such that a change of optical reflectance converges in the termination time area D. More specifically, if the change of optical reflectance is less than 20% (0.2 K), it is impossible to effectively use the termination time area D. Conversely, the time area U suitable for multi-stage recording is set to the first and second intermediate time areas B and C side. As a result, it is possible to further improve an accuracy for reading the recording mark.

On the other hand, as shown by the dotted line Q of FIG. 1, it is not always preferable that the time area U suitable for multi-stage recording comes near the initial time area A side. Five stages or more multi-level recording is sufficiently possible; however, in this case, the settable time range V corresponding to the area U becomes short. For this reason, multi-stage recording time must be set in the short time range (initial and first time area A and B), and further, the recording mark must be formed in a short time. As a result, a lag is generated in the recording time, and an influence of characteristic change on the recording layer is easy to be reflected in a change of optical reflectance; for this reason, a signal quality is easy to be worsened.

According to the present invention, the reference power is set to a degree (about 5% or more) such that the change of optical reflectance is secure to some degree in the termination time area D. As shown by the solid line P of FIG. 1, a proper change of optical reflectance is obtained from the vicinity of the end of the first intermediate time area B to the second intermediate time area C. As a result, recording can be achieved by an ideal laser beam power, which is hard to receive an influence by an error in recording and an influence by the adjacent recording mark in reading.

In this case, it has found that the above characteristic is obtained in the case where the recording layer contains an organic dye, in particular.

Next, the embodiment of the present invention will be detailedly described below with reference to FIG. 2 to FIG. 6.

Figure 2:
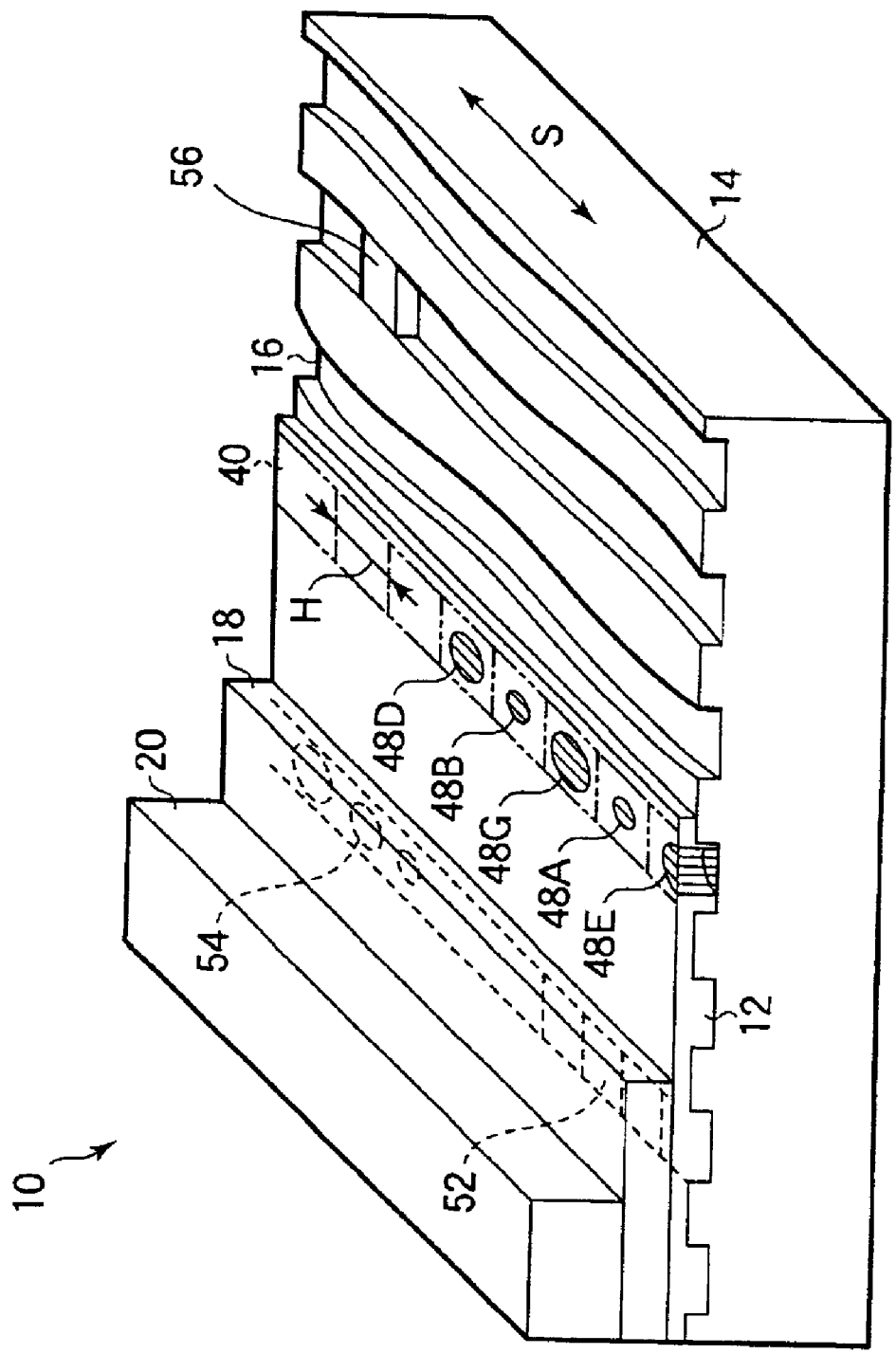
FIG. 2 is a perspective view partly in section showing principal parts of an optical recording medium to which an optical recording method according to one embodiment of the present invention is applied.

In FIG. 2, there is shown an optical recording medium (disk) 10 to which the optical recording method according to the embodiment of the present invention is applied. The optical recording medium 10 is a CD-R having a recording layer 12 using a dye, and is composed of a substrate 14 made of transparent base material, the above recording layer 12, a gold or silver reflection film (layer) 18, and a protective layer 20. More specifically, the recording layer 12 is formed out of dye applied so as to cover a laser beam guide groove 16 formed on one side (upper surface in FIG. 2) of the substrate 14. The reflection film 18 is formed on the upper side of the recording layer 12 by spattering or the like, and the protective layer 20 is formed so as to cover the reflection layer 18.

The dye used for the recording layer 12 is an organic dye including cyanine, mero-cyanine, methine-based dye and its derivative, benzenethiol metal complex, phthalocyanine dye, naphthalocyanine dye, azo dye, etc.

Figure 3:
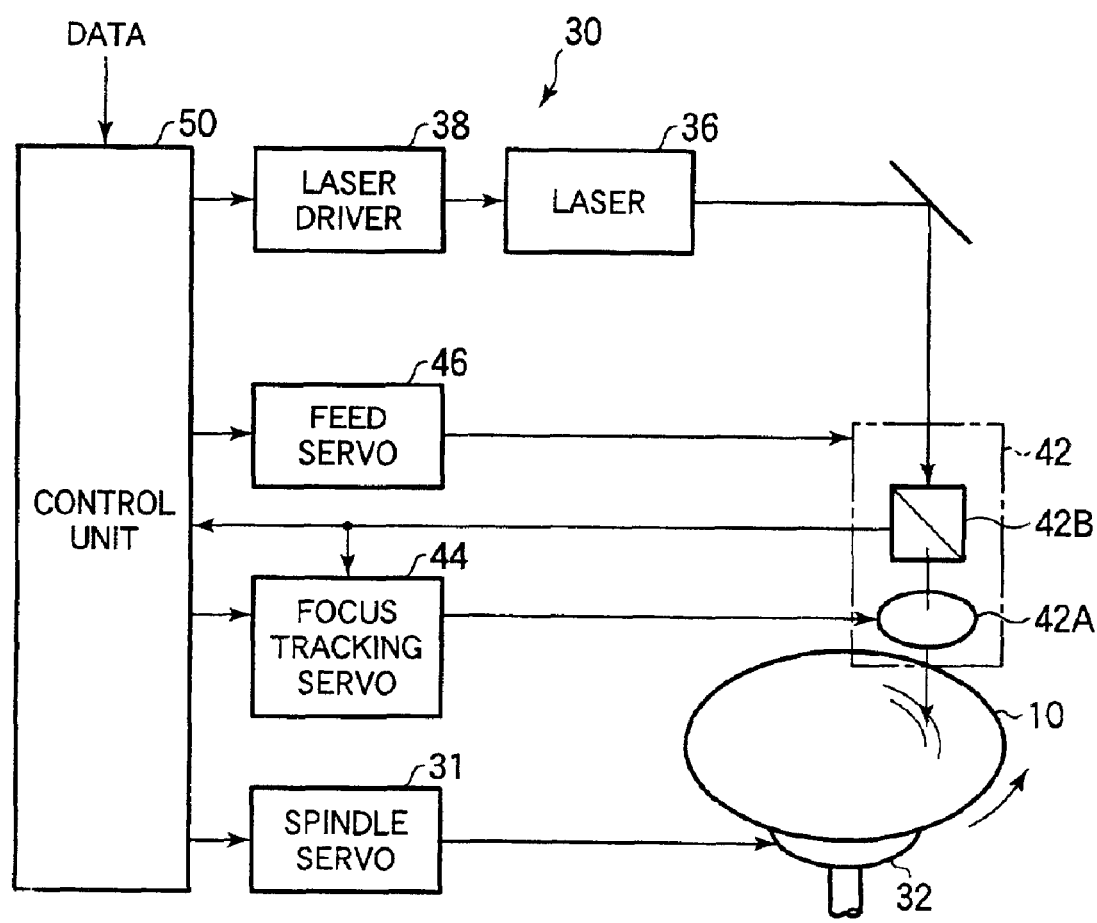
FIG. 3 is a block diagram showing an optical recording apparatus for recording information using a laser beam in order to realize the above optical recording method.

The optical recording method of the present invention applied to the optical recording medium 10 is carried out by using an optical recording apparatus 30 as shown in FIG. 3.

The optical recording apparatus 30 is a CD-R recorder. The optical recording apparatus 30 rotates the optical recording medium (disk) 10 by a spindle motor 32 via a spindle servo 31 under the condition of constant linear velocity, and then, records information onto the optical recording medium (disk) 10 by a laser beam irradiated from a laser 36.

In the above laser 36, in accordance with information to be recorded, a laser beam irradiation time to one of virtual recording cells (described later) 40 shown in FIG. 2 and FIG. 4, for example, a laser pulse frequency is controlled by a laser driver 38.

In FIG. 3, a reference numeral 42 denotes a recording optical system including an objective lens 42A and a half-silvered mirror 42B. The objective lens 42A is controlled by a focus tracking servo 44 so that a laser beam is collected (focused) onto the recording layer 12 of the disk 10. Moreover, the objective lens 42A and the half silvered mirror 42B are controlled by a feed servo 46 so as to move at a predetermined speed from the inner peripheral side to the outer peripheral side of the disk 10 in synchronous with the rotation of the disk 10.

The above-mentioned spindle servo 31, laser driver 38, focus tracking servo 44 and feed servo 46 are controlled by a control unit 50. The data (information) to be recorded on the recording layer 12 is inputted to the control unit 50.

Subsequently, the following is a description on the virtual recording cell 40 and a recording mark recorded in the virtual recording cell 40.

As shown in FIG. 2, the plural virtual recording cells 40 are continuously formed along a rotational direction, that is, a circumferential direction S of the disk 10 in the groove 16. As shown in FIG. 4, a length H in the circumferential direction of each virtual recording cell 40 is set shorter than a beam diameter (diameter of beam waist) D. Then, a laser beam is irradiated for each virtual recording cell 40, and thereby, recording marks 48A to 48G as schematically shown in FIG. 4 are formed in accordance with information to be recorded.

In this case, a size (magnitude) of the recording marks 48A to 48G expresses a degree of reduction of optical reflectance in each virtual recording cell 40 including recording mark. Namely, the larger the recording marks shown in FIG. 4 are formed, the lower the optical reflectance is. In fact, by a kind of dye used for the recording layer 12, the size or the size and optical transmittance of these recording marks 48A to 48G is variable in accordance with a laser beam irradiation time.

Figure 4:
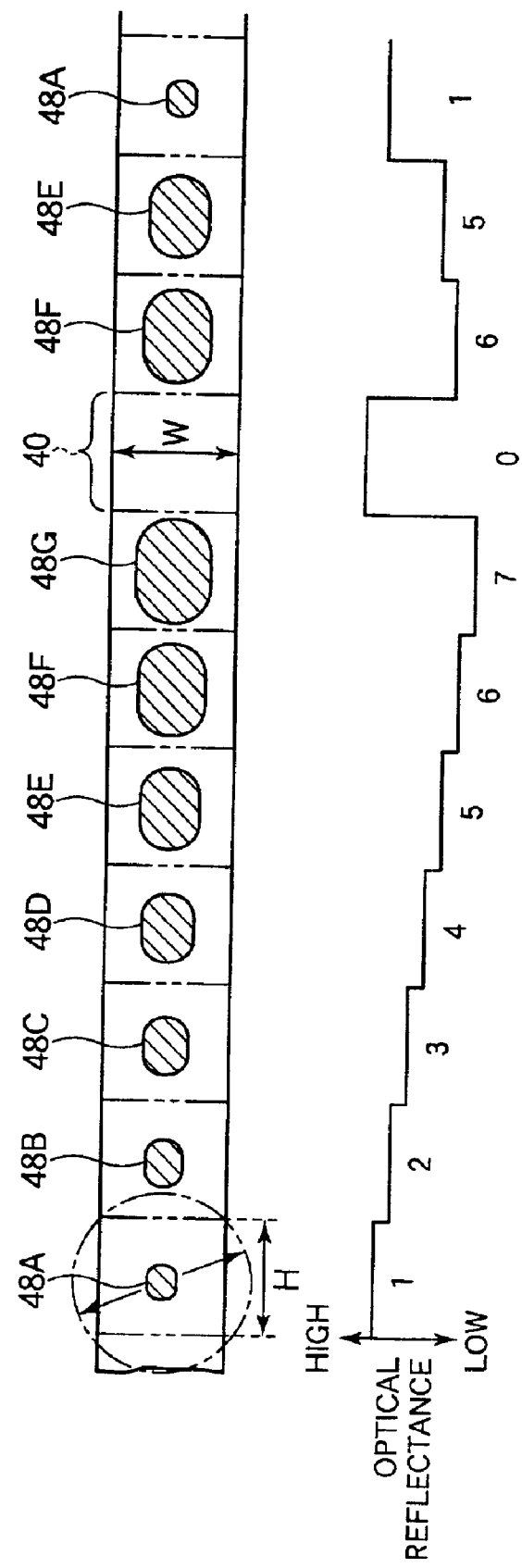
FIG. 4 is a schematic view showing a relation between a recording mark, a virtual recording cell and an optical reflectance in the case of forming the recording mark on a recording layer by the above optical recording apparatus.

By doing so, for example, it is possible to form seven-stage recording marks 48A to 48G (the reduction of optical reflectance of the virtual recording cell 40 is expressed by each size of the recording marks) as shown in FIG. 4. Optical reflectance of the recording layer 12 in the area of the recording marks 48A to 48G is lowered.

As a result, in the case where a read laser beam is irradiated to of the virtual recording cell 40 being provided with the recording marks 48A to 48G, an optical reflectance of reflected light in the virtual recording cell 40 has seven stages.

In this case, the optical transmittance of the recording layer 12 changes in the recording marks 48A to 48G. This has the same meaning such that the material forming the recording layer 12 is decomposed and modified in its quality by the laser beam irradiation, and then, the modified degree (what is called, burned degree) is different in each of the recording marks 48A to 48G. Therefore, the optical reflectance changes, and the modified portion (what is called, burned portion) is different in the thickness direction, and thereby, the optical reflectance changes.

Next, the following is a description on an optical recording method.

First, as already described in the optical recording medium 10, the virtual recording cell 40 is continuously provided along the relative moving direction S so as to have an arbitrary unit length H along the relative moving direction to the laser beam and a unit width W perpendicular to the length H. In this embodiment, the optical recording medium 10 is rotating at a predetermined speed (in this case, 4.8 m/s); therefore, a continuous predetermined time (in this case, 125 ns) is arbitrarily preset in the optical recording apparatus 30, and thereby, the unit length H (0.6 μm=4.8 m/s×125 ns) of the virtual recording cell 40 is determined. Further, the unit width W of the virtual recording cell 40 is determined as the width of the groove 16; however, in this case, the width other than above may be determined.

The laser beam power is preset so as to satisfy the following three conditions.

Condition (1):

An allowable irradiation time T of the laser beam securable to one virtual recording cell 40 is equivalent to the arbitrarily set predetermined time (125 ns). If the laser beam is irradiated to the virtual recording cell 40 over the entire allowable irradiation time T, an optical reflectance of the virtual recording cell 40 is reduced more than 50% (preferably, more than 70%) with respect to the initial reflectance K.

Condition (2):

If the laser beam is irradiated to the virtual recording cell 40 for the allowable irradiation time T, a change of optical reflectance is less than 20% of the initial reflectance K until 4/4T after 3/4T of the allowable irradiation time T elapsed.

Condition (3):

If the laser beam is irradiated to the virtual recording cell 40 for the allowable irradiation time T, a change of optical reflectance is more than 5% of the initial reflectance K until 4/4T after 3/4T of the allowable irradiation time T elapsed.

According to the reference power preset in the above manner, the laser beam is actually irradiated to the virtual recording cell 40 so that the irradiation time is modulated into five (5) stages or more. By doing so, it is possible to form recording marks 48A to 48G which give five stages or more different optical reflectance (seven stages in this embodiment) to the virtual recording cell 40.

In the optical recording medium and method of this embodiment, the reference power is preset by the above condition (1); therefore, it is possible to prevent the irradiation time suitable for multi-stage recording from being elongated to the termination side of the allowable irradiation time. As a result, an interference with adjacent virtual recording cells 40 (adjacent recording marks 48A to 48G) is prevented, so that a read accuracy can be improved.

Further, in the optical recording medium and method of this embodiment, the reference power is preset by the above condition (2); therefore, it is possible to preset the irradiation time suitable for multi-stage recording to the forward side from the termination side of the allowable irradiation time. As a result, an interference with adjacent virtual recording cells 40 is reduced, so that a read accuracy can be improved.

Further, the reference power is preset by the above condition (3); therefore, it is possible to preset a suitable irradiation time in the intermediate time area of the allowable irradiation time. As a result, the irradiation time can be secured longer, and a difference (interval) of the irradiation time in each stage can be widened; therefore, it is hard to receive an influence by an irradiation error (power, time, quality of recording layer, etc.).

In particular, as described in this embodiment, even if each length of the recording marks 48A to 48G of multi-level recording is set less than the diameter D of the focused beam waist from the read laser, it is possible to securely make a data detection. As a result, it is possible to generate the extremely small recording mark, which has a size less than the focused beam waist and five stages or more different reflectance, and thus to realize optical recording with a very high recording density.

Further, as described in this embodiment, the optical recording medium and the optical recording method are adaptable to the case where the recording layer 12 of the optical recording medium 10 contains an organic dye component. In fact, as explained in the example described later, multi-level recording is achieved by the method of generating recording mark by a reaction of the organic dye component. In this case, of course, the present invention may be applicable to other recording layers containing no organic dye component, for example, recording layers formed of inorganic dye and other materials.

This embodiment has described the case where the above optical recording medium 10 is a CD-R disk. The optical recording medium to which the optical recording method of the present invention is applied is not limited to the above CD-R disk, and is widely applicable.

Further, this embodiment has described the optical recording medium 10 having non-recording area in which information such as data has not been recorded. The present invention is not limited to the above optical recording medium 10, and is applicable to an optical recording medium in which information is recorded by five stages or more, that is, multi-level recording.

Further, the size of the virtual recording cell 40 set when forming the recording mark by the optical recording apparatus 30 is not limited to the above embodiment. In particular, it is preferable that the length of the virtual recording cell 40 is set so as to become equal to the width of the groove 16 so long as the beam waist diameter of laser beam is further made small. On the other hand, in the case of recording the recording mark at multiple stages such as five stages, the length of the virtual recording cell 40 may be set larger than the laser beam waist. In this case, part of the recording marks can be made into a size more than the beam waist.

Figure 5:
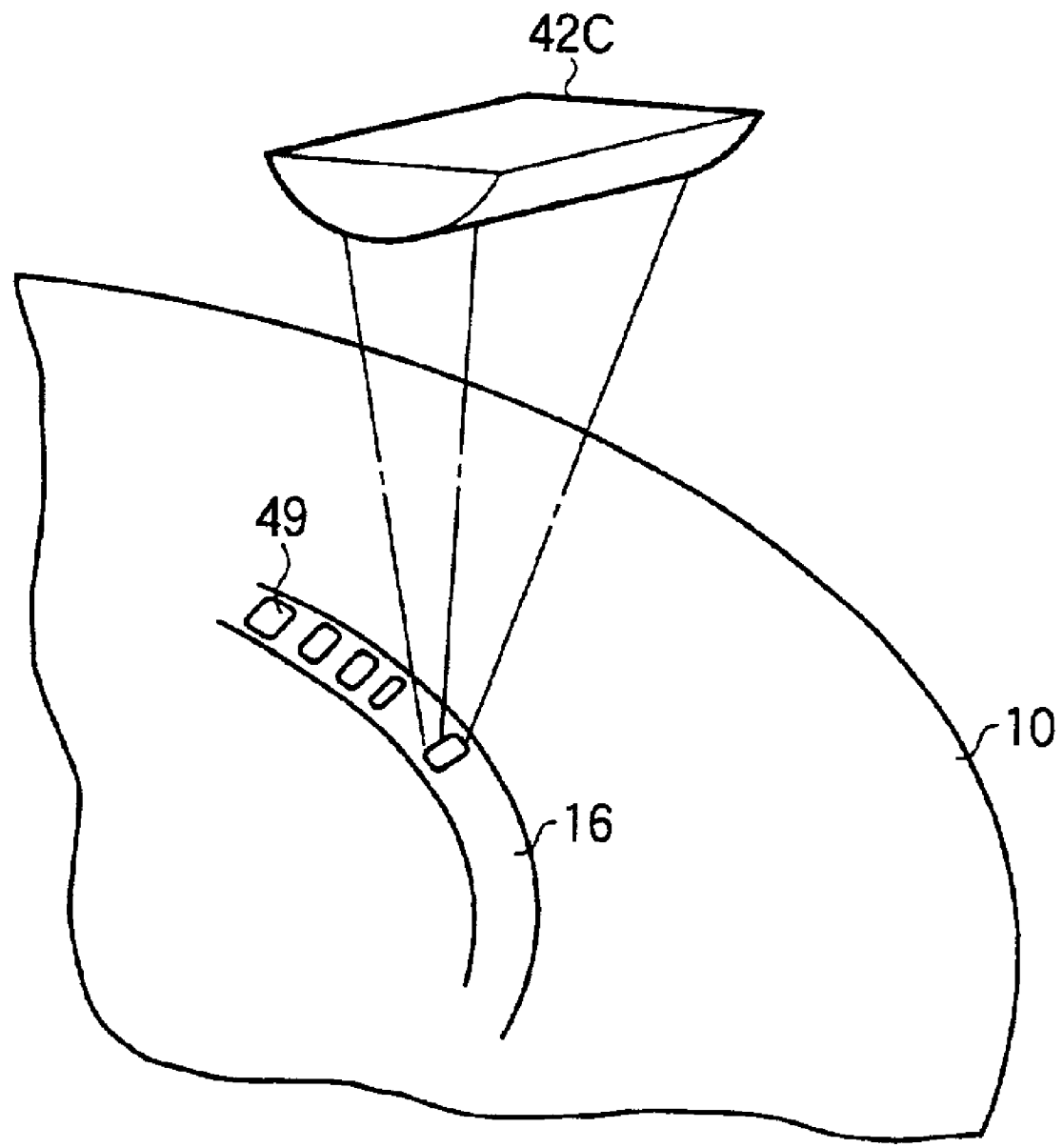
FIG. 5 is a perspective view schematically showing the case where the laser beam irradiated to the virtual recording cell has another shape.

Moreover, the recording laser beam has a circular shape in the recording layer 12. As shown in FIG. 5, however, this can utilize, for example, a beam shaping prism 42C in addition to the objective lens 42A and the beam shape may be formed into an elliptic or linear shape as shown in FIG. 5, which is short in the feed direction of the optical recording medium 10, and is long in the direction perpendicular to the feed direction. In this case, a recording mark 49 becomes short, so that the virtual recording cell can be further shortened. In other words, it is possible to improve a recording density.

Further, the optical recording medium of this embodiment may be constructed so as to previously have a plurality of pits as shown by a reference numeral 52 in FIG. 2, which have the number of different reflectance corresponding to the signal modulation stages of the optical recording medium 10. The following specific information may be recorded in the plurality of pits 52. More specifically, the information includes information for individually identifying the optical recording medium 10, information for identifying whether a recording medium is an optical recording medium for multi-level recording, reference power information of laser beam satisfying the above conditions (1) to (3) for recording and reading the recording medium, etc. The following case is a concept included in the scope of the present invention. Namely, specific information is read in the optical recording medium 10 in recording, and then, according to the recorded information, the reference power is set so as to achieve optical recording.

Besides, by the above specific information, it is possible to securely identify whether a recording medium is an optical recording medium for multi-level recording, and to determine an irradiation time of laser beam in accordance with the number of stages of pit previously recorded. Therefore, multi-level recording and reading can be further securely carried out.

As shown by a reference numeral 56 in FIG. 2, the laser beam guide groove is provided with a groove partition, which partially partitions the groove, and thereby, the same effect as above can be obtained. The groove partition may be usable solely or may be combined.

EXAMPLES

Using the above optical recording medium 10 and the optical recording apparatus 30, a plurality of reference powers of laser beam was set, and then, an experiment of multi-level recording was conducted.

Example 1

Using three kinds of laser beams (individually having reference power 10 mW, 11 mW and 12 mW) satisfying the above three conditions (1) to (3), seven stage irradiation time was set, and thereafter, multi-level recording was carried out.

Figure 6:
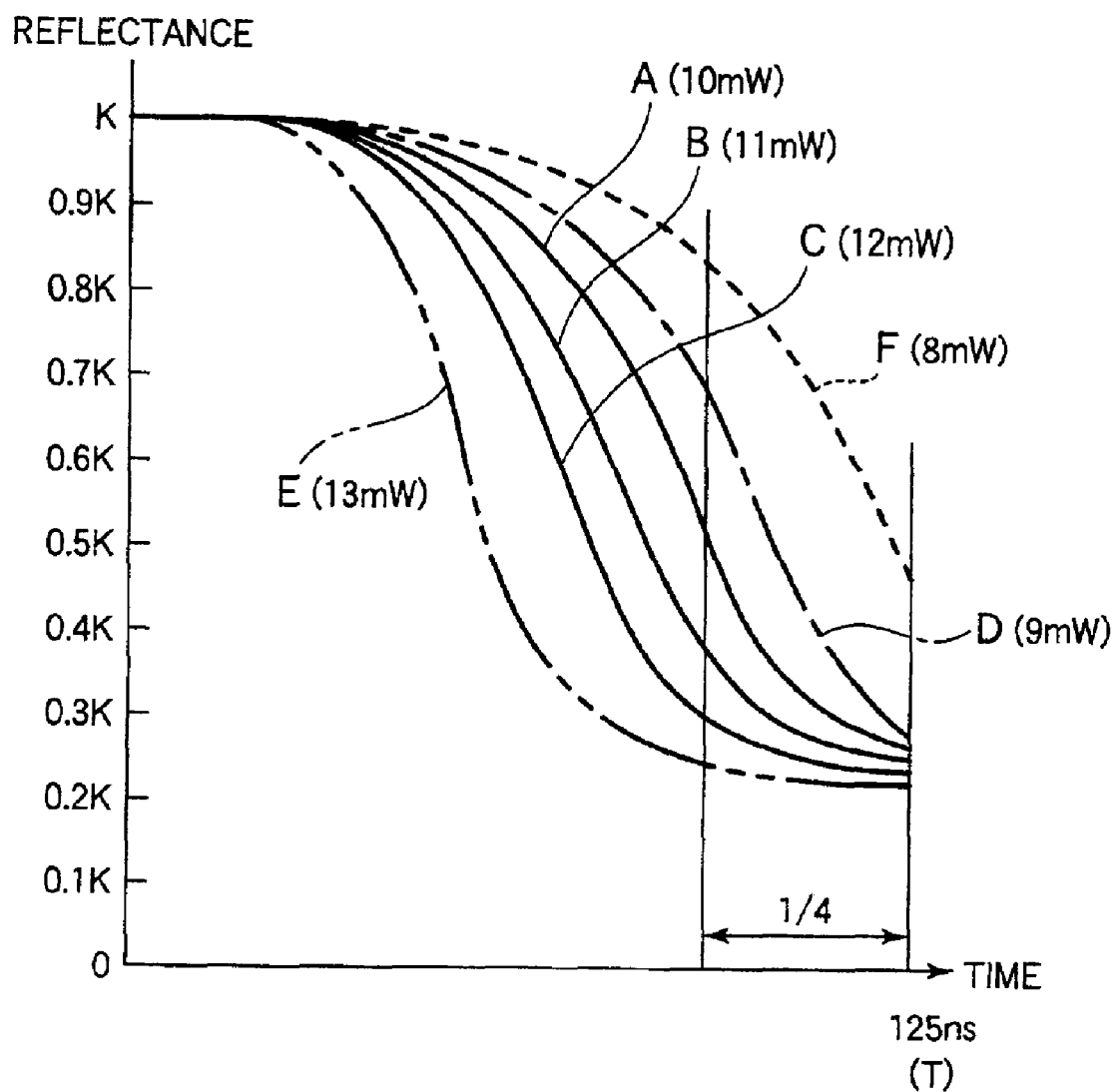
FIG. 6 is a graph showing a change of reflectance in the case where a laser beam is irradiated for an allowable irradiation time by the reference power set for realizing the optical recording method of the embodiment.

As a result, it was possible to securely read a recording mark written by each reference power. Further, the signal jitter value was preferable. In FIG. 6, there is shown a time change (solid lines A, B and C) of optical reflectance in the case where a laser beam having each reference power is irradiated to the virtual recording cell over the entire allowable irradiation time.

As shown in FIG. 6, in all laser beams, the optical reflectance was finally reduced more than 70% of the initial reflectance K. In the termination area ¼ section of the allowable irradiation time, the change of reflectance properly converged, and then, an area suitable for recording was secured for a relatively long time. It can be seen that this satisfies the above conditions (1) to (3).

Example 2

Using a laser beam (having reference power 9 mW), which satisfies the above conditions (1) and (3) but does not satisfy the above condition (2), seven stage irradiation times were set, and thereafter, multi-level recording was carried out.

As a result, it was possible to securely read a recording mark written by each reference power. Further, the signal jitter value was slightly inferior to the Example 1. In FIG. 6, there is shown a time change (chain line D) of optical reflectance in the case where a laser beam having each reference power is irradiated to the virtual recording cell over the entire allowable irradiation time.

As shown in FIG. 6, in all laser beams, the optical reflectance was finally reduced more than 70% of the initial reflectance K. However, in this case, the change of optical reflectance is large in the termination area ¼ section of the allowable irradiation time; as a result, the irradiation time corresponding to the area suitable for recording was slightly shifted to the termination side of the allowable irradiation time. For this reason, the influence of adjacent recording mark was given; therefore, it will be considered that the jitter value has reduced as compared with the Example 1.

Example 3

Using a laser beam (having reference power 13 mW), which satisfies the above conditions (1) and (2) but does not satisfy the above condition (3), seven stage irradiation times were set, and thereafter, multi-level recording was carried out.

As a result, it was possible to securely read a recording mark written by each reference power. Further, the signal jitter value was slightly inferior to the Example 1. In FIG. 6, there is shown a time change (two-dotted chain line E) of optical reflectance in the case where a laser beam having each reference power is irradiated to the virtual recording cell over the entire allowable irradiation time.

As shown in FIG. 6, in all laser beams, the optical reflectance was finally reduced more than 70% of the initial reflectance K. However, in this case, the change of optical reflectance is small in the termination area ¼ section of the allowable irradiation time, and the change of reflectance converged relatively earlier. As a result, the irradiation time corresponding to the area suitable for recording became short; for this reason, the influence by a fine error of irradiation time was given; therefore, it will be considered that the jitter value has reduced as compared with the Example 1.

Comparative Example 1

Using a laser beam (having reference power 8 mW), which does not satisfy all of the above conditions (1) to (3), seven stage irradiation time was set, and thereafter, multi-level recording was carried out.

As a result, it was impossible to clearly read a recording mark written by each reference power. Further, the signal jitter value was deteriorated. In FIG. 6, there is shown a time change (dotted line F) of optical reflectance in the case where a laser beam having each reference power is irradiated to the virtual recording cell over the entire allowable irradiation time.

As shown in FIG. 6, in all laser beams, the optical reflectance was finally reduced more than 50% of the initial reflectance K, and the area suitable for recording concentrated on the termination area ¼ section of the allowable irradiation time. For this reason, the irradiation time in forming the recording mark must be made long; as a result, interference with adjacent recording mark was generated. The factor incapable of reading the recording mark is because the reference power was too small.

As is evident from the above description, according to the present invention, it is possible to achieve newly five stages or more multi-level optical recording, and to further improve a read accuracy. Therefore, an information recording density can be greatly improved

What is claimed is:

1. An optical recording medium, including a reflective layer and a recording layer, and constructed in a manner that a recording mark is formed on the recording layer by irradiating a laser beam so as to record information, the recording layer being formed with plural virtual recording cells, each of which has an arbitrary unit length and a unit width perpendicular to the unit length, the unit length of a virtual recording cell being associated with an allowable irradiation time T of a laser beam securable to the virtual recording cell, the laser beam having a reference power, which is preset so that an optical reflectance of the virtual recording cell is reduced more than 50% with respect to an initial reflectance, the optical reflectance of the virtual recording cell is modulated into five stages or more by the laser beam within the allowable irradiation time T, the virtual recording cell being formed with a recording mark which gives five stages or more different optical reflectance to the virtual recording cell, wherein the virtual recording cell is capable of changing the optical reflectance, during a time period between 3/4 T and 4/4 T of the allowable irradiation time T, less than 20% and more than 5% of the initial reflectance.

2. The optical recording medium according to claim 1, wherein the recording layer contains an organic dye.

3. An optical recording method, which irradiates an laser beam to an optical recording medium including a reflective layer and a recording layer, and forms a recording mark the recording layer so as to record information, comprising:

continuously forming a virtual recording cell, which has an arbitrary unit length and a unit width perpendicular to the unit length, on the recording layer in a relative moving direction to the laser beam;

presetting a reference power of the laser beam so that an optical reflectance of the virtual recording cell is reduced more than 50% with respect to an initial reflectance in the case where the laser beam is irradiated to the virtual recording cell over the entire allowable irradiation time T securable to one virtual recording cell;

irradiating the laser beam having the preset reference power to the virtual recording cell so that the irradiation time is modulated into five stages or more; and forming a recording mark which gives five stages or more different optical reflectance to the virtual recording cell, wherein in the case where the laser beam is irradiated to the virtual recording cell over the entire allowable irradiation time T, the reference power is preset so that a change of the optical reflectance during a portion between 3/4 T and 4/4 T of the allowable irradiation time T elapsed is less than 20% and more than 5% of the initial reflectance.

4. The optical recording method according to claim 3, wherein the recording layer contains an organic dye, and is applied in the case of recording information in the recording layer.

5. A method for reducing a reflectance of an optical recording medium from a reference reflectance, comprising:

determining a reference power for irradiating a laser beam, the laser beam able to burn the recording medium to reduce the reflectance of the recording medium, the reference power corresponding to the reference reflectance, the reference power enabling the laser beam to reduce the reflectance of the recording medium more than 50% from the reference reflectance; and irradiating the laser beam on the recording medium with an irradiating power, the irradiating power less than the reference power and varying based on information to be recorded on the recording medium in a time period during which a cell of the recording medium is irradiated, the laser beam able to reduce at least 5%, but no more than 20%, of the reflectance of the recording medium from the reference reflectance during a last quarter of the time period.

6. The method of claim 5, the laser beam able to reduce the reflectance of the recording medium to five different levels in a fraction of the time period during which the cell is irradiated.

7. The method of claim 6, a size of the cell being smaller than a size of the laser beam.

8. The method of claim 6, the cell being one of a plurality of virtual recording cells, the plurality of virtual recording cells arranged continuously along a direction in which the laser beam moves relative to the recording medium with neighboring virtual recording cells adjacent to each other.

9. The method of claim 8, the plurality of virtual recording cells having a same predetermined length in the direction in which the laser beam moves relative to the recording medium.

10. The method of claim 8, the time period being a time duration for the laser beam to pass a virtual recording cell.

11. The method of claim 5, the laser beam reducing the reflectance of the recording medium more than 50% from the reference reflectance during a first ¾ of the time period.

12. The method of claim 5, the laser beam reducing the reflectance of the recording medium more than 50% from the reference reflectance between ¼ and ¾ of the time period.

\* \* \* \* \*